United States Patent [19]

Mensing et al.

[11] Patent Number: 5,226,112
[45] Date of Patent: Jul. 6, 1993

[54] METHOD FOR TRANSLATING A PLURALITY OF PRINTER PAGE DESCRIPTION LANGUAGES

[75] Inventors: David B. Mensing, Hilton, N.Y.; Gayle M. Tyson, Sunnyvale, Calif.; Michael L. Campanella; John C. Czudak, both of Webster, N.Y.; Charles R. Nail, Rochester, N.Y.; Thomas Robson, Penfield, N.Y.; Lyssa Menard, Santa Clara, Calif.

[73] Assignee: Xerox Corporation, Stamford, Conn.

[21] Appl. No.: 898,045

[22] Filed: Jun. 12, 1992

[51] Int. Cl.$^5$ ............................................. G06K 15/00
[52] U.S. Cl. ..................................... 395/114; 395/163
[58] Field of Search .............. 395/101, 116, 115, 114, 395/163, 164, 165, 375, 500; 346/154; 358/404, 444; 400/61, 62

[56] References Cited

U.S. PATENT DOCUMENTS

| | | | |
|---|---|---|---|
| 4,833,596 | 5/1989 | Buckland et al. | 364/200 |
| 4,920,481 | 4/1990 | Binkley et al. | 364/200 |
| 4,992,958 | 2/1981 | Kageyama et al. | 395/116 |

Primary Examiner—Arthur G. Evans
Attorney, Agent, or Firm—Gary B. Cohen

[57] ABSTRACT

A method for use with an imaging system server of the type having a first processing arrangement coupled with a second processing arrangement is provided. The method includes the steps of: transmitting a first job written in a first printer page description language to the second processing arrangement; setting a flag in the second processing arrangement to a first status in response to transmitting the first job thereto; translating the first printer page description language into a first interpreted output with a first memory map; transmitting the second job to the first processing arrangement; setting the flag in the second processing arrangement to a second status in response to transmitting the second job to the first processing arrangement; checking the status of the flag in the second processing arrangement; and swapping portions of the first memory map and portions of a second memory map disposed in a storage section with the first processing arrangement in response to a change in the status of the flag, so that the portions of the first memory are disposed in the storage section and portions of the second memory map are disposed in the second processing arrangement for use in translating the second printer page description language into a second interpreted output.

14 Claims, 7 Drawing Sheets

FIG. 3

METHOD FOR TRANSLATING A PLURALITY OF PRINTER PAGE DESCRIPTION LANGUAGES

BACKGROUND OF THE INVENTION

The present invention relates generally to interpreting jobs written in one of a plurality of page description languages for printing with a printing apparatus, and more particularly to a technique for swapping interpretation context files within a printing apparatus server to optimize the use of multiple interpreters therein.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

A PDL is a method of describing printed page(s) in a printer independent format. A PDL establishes as interface between a print driver or client and a print server or printer. No one standard PDL presently exists, and as a result a number of industry standards have emerged. Currently existing PDLs include PostScript® ("PS"), Hewlett Packard Printer Control Language ("HP-PCL") and Interpress Page Description Language. Documentation regarding these three languages can be found in the following references, the pertinent portions of which are incorporated herein.

PostScript® Language Reference Manual, Second Edition, Addison-Wesley Publishing Co., 1990.

PCL 5 Printer Language, Technical Reference Manual, First Edition, Hewlett Packard Co., 1990.

Harrington, S. J. and Buckley, R. R., Interpress: The Source Book, Simon & Schuster, Inc., New York, N.Y., 1988.

Xerox® Corporation presently is marketing a server for a printing apparatus, the server being referred to as the "DocuTech TM Manager Server" (DocuTech Manager Server is a trademark of Xerox Corp.) This server is adapted to translate a job written in a first PDL, such as PS or HP-PCL, into a second PDL, such as Interpress, for printing of the job on a Xerox® compatible printing apparatus. At the heart of the server are two interpreters, one of which is adapted to translate PS and the other of which is adapted to translate PCL. Each interpreter contains software, written by either Adobe® Systems Inc. or Peerless® Corp. to facilitate the translation process.

In the area of data processing systems it is known that a coprocessor can be employed to assist a main processing unit to perform some of the more time consuming data processing tasks. The following two references are examples of arrangements in which a host system is used advantageously in conjunction with a coprocessor:

U.S. Pat. No. 4,833,596, Patentee: Buckland et al., Issued: May 23, 1989.

U. S. Pat. No. 4,920,481, Patentee: Binkley et al., Issued Apr. 24, 1990.

The operation of a data processing system having a main storage area with an operating system can be further enhanced by a technique referred to as swapping. As is known, in AT&T labs Bell System UNIX® operating system processes are swapped to and from secondary storage as needed, thereby enabling a single computer CPU to be used simultaneously by a number of users each running some unique application program. As discussed by the following reference, systems exist in which core images can be swapped in and out of main storage in accordance with user demands.

Deitel, H. M., An Introduction to Operating Systems, Revised First Edition, Addison-Wesley Publishing Co., 1984, pp. 169, 171, 485–488, 494, 512 and 582–584.

It would be desirable to provide a server that obtains multiple PDL interpreter capability in an efficient and economical manner by exploiting certain advantageous data processing system features, such as coprocessing and swapping.

SUMMARY OF THE INVENTION

In accordance with the present invention, there is provided a method for use with an imaging system server of the type having first processing means coupled with second processing means the imaging system server being adapted to use a first memory map having a sequence of instructions to translate a first job written in a first printer page description language and to use a second memory map having a sequence of instructions to translate a second job written in a second printer page description language, one of the memory maps being disposed in the second processing means and portions of the other memory map being disposed in a storage section, comprising the steps of: transmitting the first job to the second processing means; setting a flag in the second processing means to a first status in response to transmitting the first job thereto; translating the first printer page description language into a first interpreted output with the first memory map; transmitting the second job to the first processing means; setting the flag in the second processing means to a second status in response to transmitting the second job to the first processing means; checking the status of the flag in the second processing means; and swapping portions of the first memory map and portions of the second memory map with the first processing means in response to a change in the status of the flag, so that the portions of the first memory are disposed in the storage section and portions of the second memory map are disposed in the second processing means to translate the second printer page description language into a second interpreted output.

These and other aspects of the invention will become apparent from the following description, the description being used to illustrate a preferred embodiment of the invention when read in conjunction with the accompanying drawings.

BRIEF DESCRIPTION OF THE DRAWING

FIG. 3 is a schematic view of an exemplary job ticket;

DETAILED DESCRIPTION OF THE PREFERRED EMBODIMENT

Figure 1:
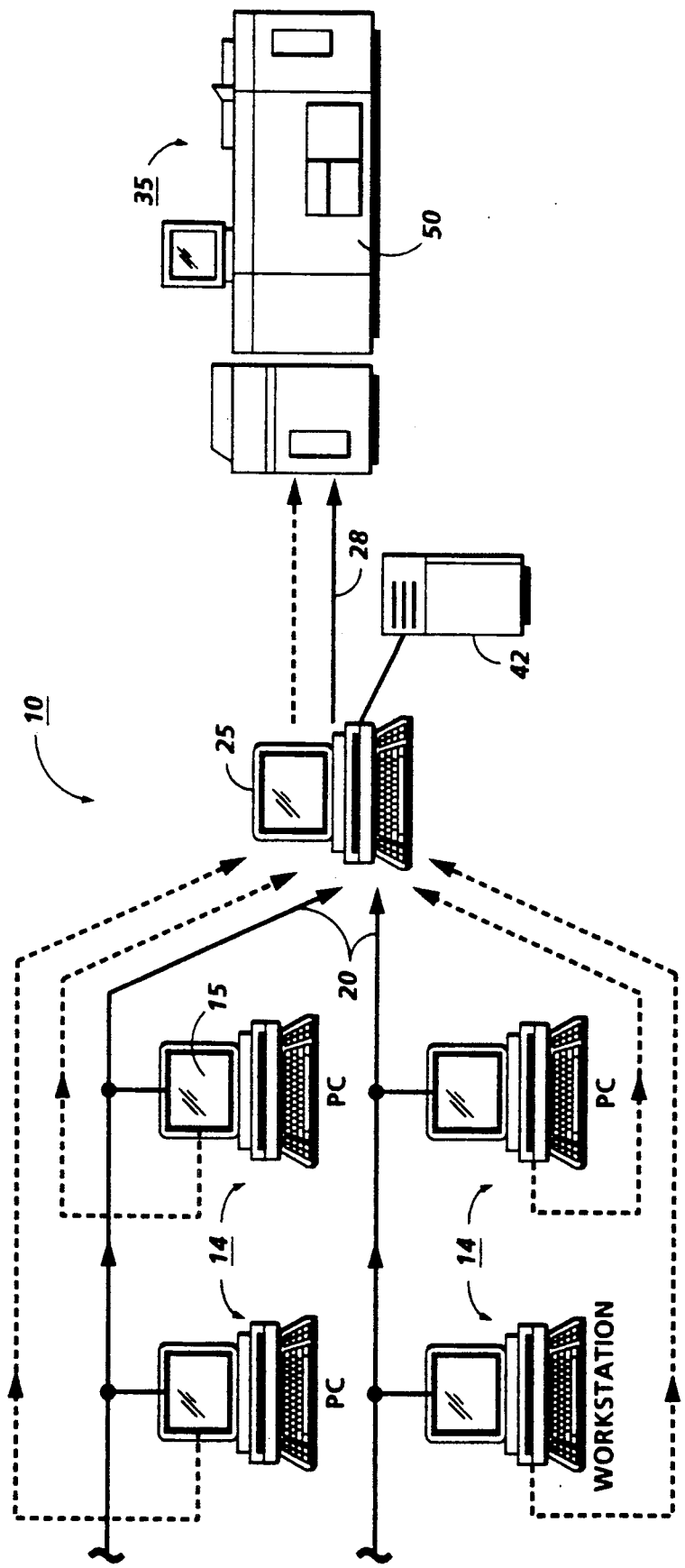
FIG. 1 is a schematic view of a printing arrangement including a plurality of client workstations interfaced with a printing apparatus by a server.

Referring to FIG. 1, there is shown a printing arrangement, designated generally by the numeral 10. The printing arrangement 10 includes a plurality of remote inputs such as PCs, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

Figure 2:
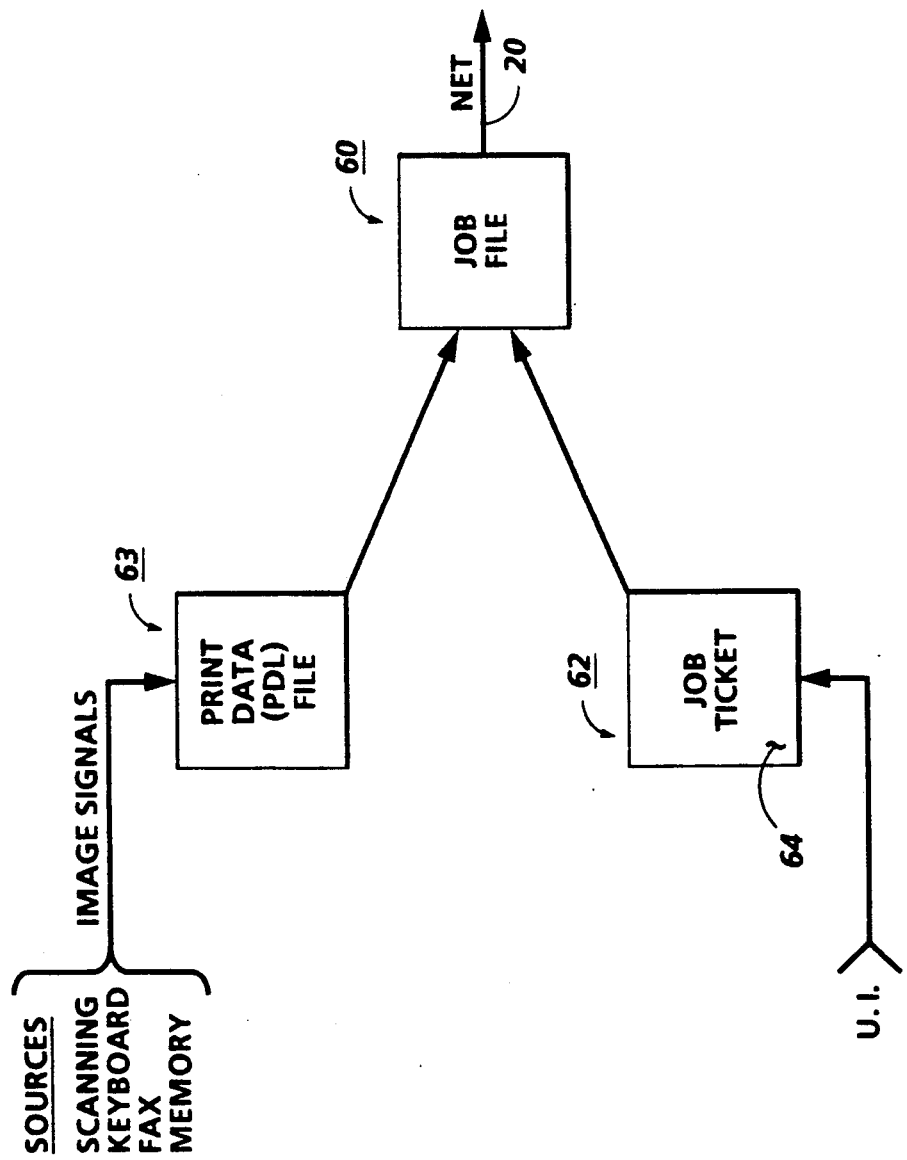
FIG. 2 is a schematic view of a job file and the contents thereof.

Referring to FIG. 2, electronic job files 60, or parts thereof, are created at the individual workstations 14, each job file being comprised of a Job Specification 62 and Print Data file 63 expressed in a PDL. Job Specification 62 is in the form of a job ticket 64 having instructions for routing, handling, and processing the job 62. As will be clarified from the discussion below, in the preferred embodiment of the present invention, the PDL of print data file 63 is either written in Postscript ® ("PS") or Hewlett Packard Printer Control Language ("HP-PCL"). The jobs in Print Data file 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels or PDL instructions in Print Data File 63 are arranged as electronic documents or pages for printing on a print media such as paper stock or sheets.

The programming instructions in the job ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a job ticket 64 with the program selections available with that printer may be displayed at the client's workstation 14 as described more fully in U.S. patent application Ser. No. 07/752,155, filed Aug. 29, 1991, entitled "Dialog Filtering," the pertinent portions of which are incorporated herein. During the printing process, the server 25 transmits the printing instructions from the job ticket 64 to the printing system selected.

Figure 3:
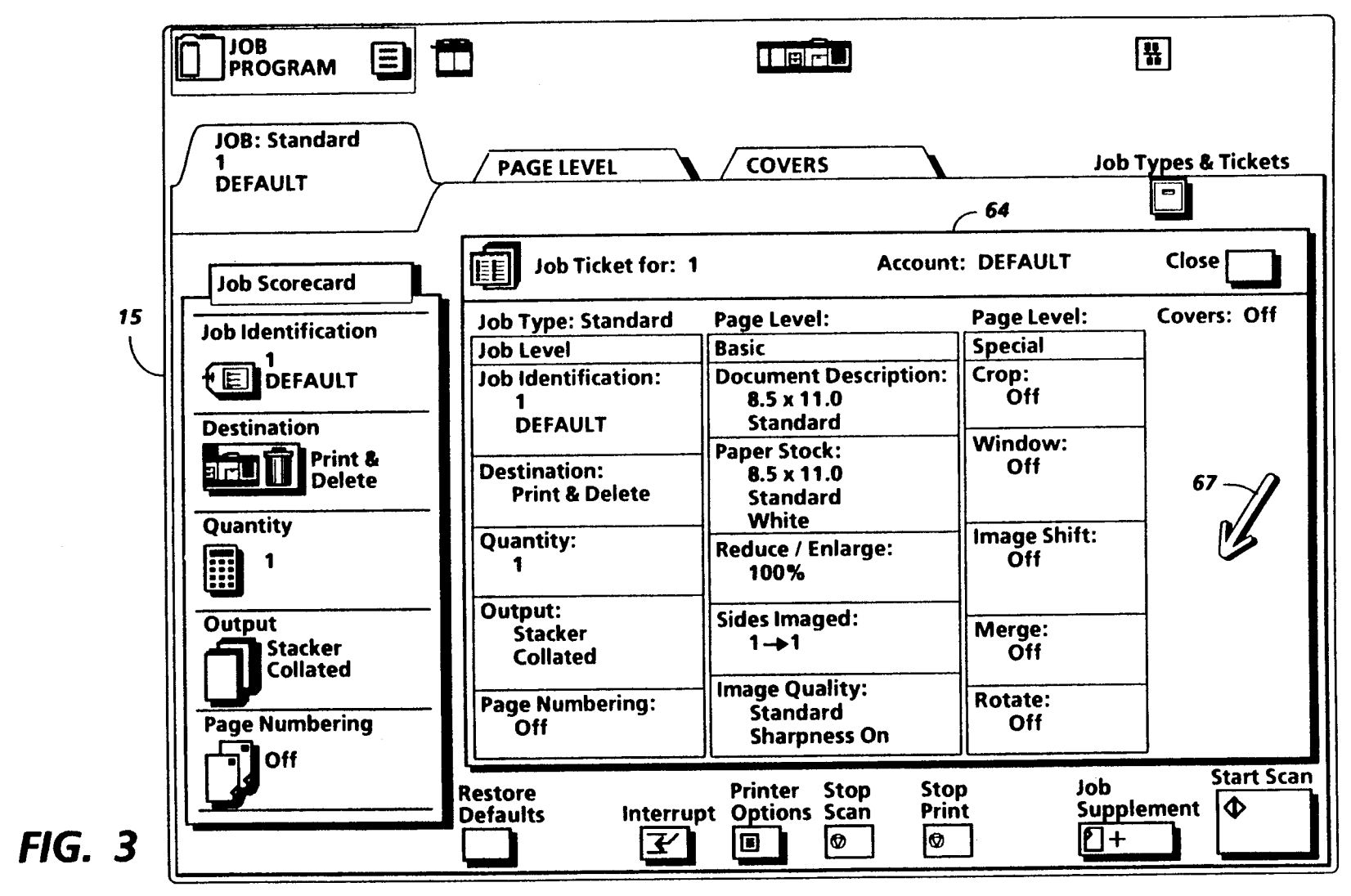

A job ticket 64 comprises a series of electronic program instructions for processing a job. Normally, job ticket 64 consists of an electronic format (an example of which is shown in FIG. 3) having various programming choices displayed on screen 15 of the workstation 14 being used to create the job. The client at the workstation interactively fills out the job ticket by making selections electronically using the workstation mouse, keyboard, etc. It should be recognized that the job ticket instructions encompass not only print programming instructions for the job itself but also routing and handling instructions for the server 25. The completed job ticket 64 is combined with the job in Print Data file 63 in the job file 60.

The server 25 comprises any suitable interface for receiving job files 60 from workstations via network 20, with the ability to access and decode the job processing instructions on the accompanying job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 may be provided for this purpose.

The printing system 35 may include one or more high speed electronic printers 50 for processing jobs in accordance with the instructions input through the job ticket accompanying each job file. While a single printer 50 is shown, plural printers, either at a single central location or at several remote locations may be envisioned. Printer 50, for example, may be a xerographic based printer of the type shown and described in U.S. patent application Ser. No. 07/589,941 entitled "Electronic Printing System for Printing Signatures," the pertinent portions of which are incorporated herein. In other contemplated implementations of the preferred embodiment, the printer 50 could comprise other known printer types such as ink jet, ionographic, LED, and the like.

Figure 4:
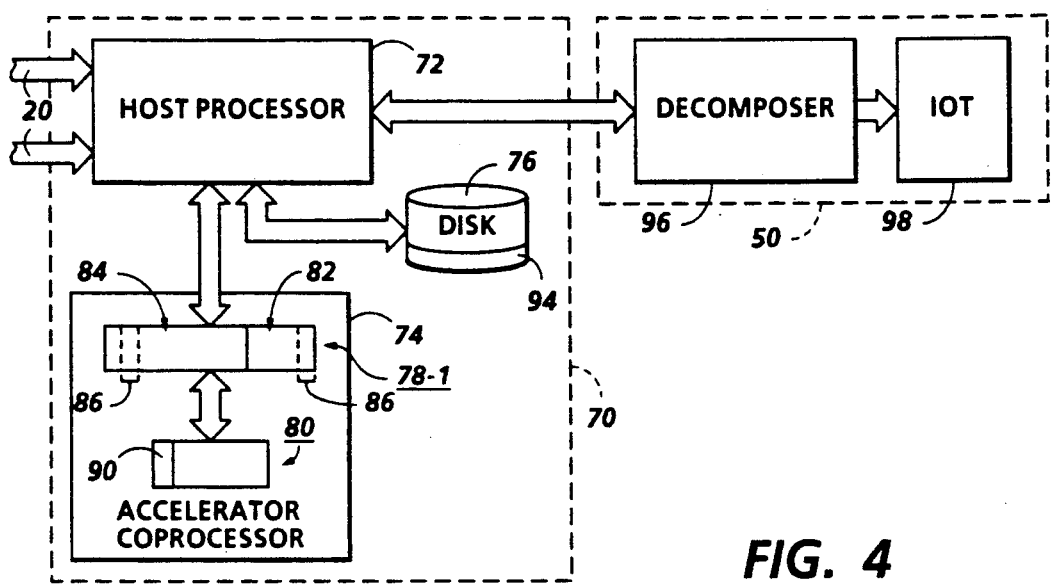
FIG. 4 is a schematic, block diagramatic view of the server and the printing apparatus used to implement the technique of the present invention.

Referring to FIG. 4, the structure of the server 25 and the printing system 35 is discussed in further detail. In the preferred embodiment of the invention, a swapping technique is achieved with an arrangement that is designated by the numeral 70. The arrangement includes a host processor 72, an accelerator coprocessor (ACP) card 74 and a disk storage device 76. In one example, the host processor is an IBM PC-AT system having an Industry Standard Architecture (ISA) or an Extended Industry Standard Architecture (EISA) bus to accept the ACP card. The host processor 72 can be configured for operation in a network environment. When the host processor 72 is configured for network operation, it is preferably Novell ® certified for Netware 386 ™.

In the preferred embodiment, the ACP card 74 comprises the following major blocks:
80960CA Microprocessor
Host System ISA Interface
Extended Bus Interface
Memory (16 MBytes)
Programmable Read Only Memory
Timer/Counter
256 Byte Board Identification EEPROM The host processor 72 is capable of transferring data to and from ACP memory through a 128K byte sliding shared memory window. The ACP 74 also can use a small section of the host processor's IO address space. By writing to an IO data port of the ACP 74, the host processor 72 is able to send commands to the ACP 74. In turn, by reading the IO data port, the host processor 72 is able to receive acknowledgement messages back from the ACP 74. These messages are typically 1 byte in length and are used to synchronize the actual data transfers in shared memory. In the preferred embodiment, two 8 bit data ports are used to communicate synchronizing swap requests and acknowledgements between the ACP 74 and the host processor 72 prior to the actual transfer of PDL decomposer code and font cache data. These two ports are referred to as: the Host to Processor and Processor to Host Data Registers ("HPDR" and "PHDR").

Figure 5:
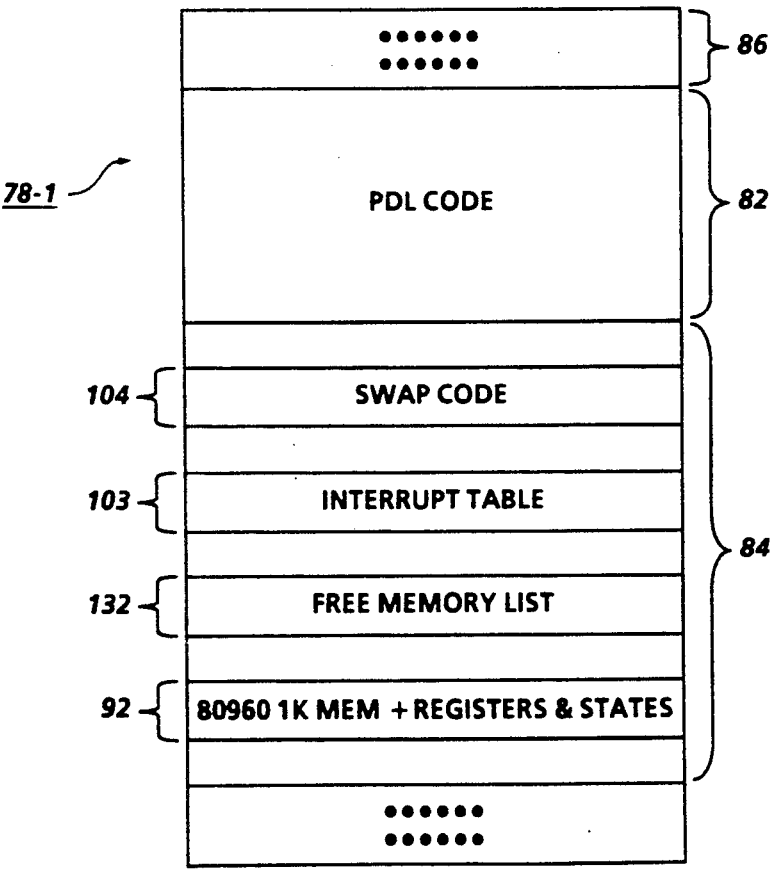
FIG. 5 is a schematic view of a memory map capable of being used to interpret a PDL, i.e., a sequence of instructions, employed to translate page description language contained in the job file.

Referring still to FIG. 4, the ACP card 74 is shown with a memory map 78-1, which includes all of the software necessary to interpret a page description language, and the 80960CA microprocessor, the microprocessor being designated by the numeral 80. Referring to FIG. 5, the memory map 78-1, which includes a user section 82 and a system section 84, is shown in greater detail. The memory map 78-1 further includes a section 86 having registers through which the HPDR and the PHDR can communicate and a status flag can be set.

In the illustrated embodiment of FIG. 5, the user section 82 comprises a section for retaining PDL interpretation code, the PDL interpretation code being adapted to facilitate the interpretation of a job file expressed in a first PDL, such as PS or HP-PCL. In the preferred embodiment, the PDL interpretation code is written by either Adobe ® Systems Inc. or Peerless ® Corp., in conjunction with Xerox ® Corp., for use by Xerox ® Corp. in its Xerox Production Print Services System ("Xerox Production Print Services" is a trademark of Xerox ® Corp.), the Xerox Production Print Services System preferably including a Media Server and a Network Server. It should be understood that the PDL interpretation code facilitates translation of the job file 60 from a first PDL, such as PS or HP-PCL, into a second PDL file, such as Interpress. Those skilled in the art will appreciate that such translation could be, in one example, achieved by using a configurable PDL interpreter, such as one manufactured by Adobe ® Systems Inc. or Peerless ® Corp to reduce the text and graphics of the job file 60 into a bitmap and then to express the bitmap in the form of a second PDL, such as Interpress.

It should be appreciated that only selected portions of the system section 84 are shown. Much of the software for the section 84 simply serves as one of various approaches for implementing the processes illustrated in FIGS. 6 and 7A-7B, the significance of which processes will be discussed in further detail below. It will be recognized by those skilled in the art that, in practice, various software tools, such as tables, e.g., fault, system procedure and control tables, timers and controls therefor, control implementations, storage locations, and stacks, typically would be employed in the implementation of the system section 84.

Referring to FIGS. 4 and 5, the microprocessor 80 includes a section 90 which contains information regarding the internal state of the microprocessor 80, such information including 1K memory, registers and states. This information selectively can be stored in a layer 92 of the system section 84.

Referring specifically to FIG. 4, the host processor 72 is coupled with the disk drive device 76 so that, as explained in further detail below, portions of the memory map 78-1 can be transferred, in the form of a context file, thereto. Preferably, at any one moment, one or more PDL context files, designated by the numeral 94, are stored in the disk drive 76. Upon processing a job file 60, the interpreted PDL file can be transmitted to one of a plurality of output or printing devices. In the preferred embodiment, the interpreted PDL file is expressed in Interpress, and is transmitted to the printer 50 which comprises a decomposer 96 and an image output terminal (IOT) 98. In one example, the decomposer 96 is of the type used in a Xerox ® 4045 ("Xerox 4045" is a trademark used by Xerox ®) printer and employs software of the type described in Interpress: The Source Book. Additionally, the IOT can be any suitable print engine, such as the DocuTech ™ print engine mentioned above. In operating the printer, the interpreted output from the host processor 72 is transmitted to the decomposer 96 where it is decomposed into graphics and text for printing by the IOT 98.

Figure 6:
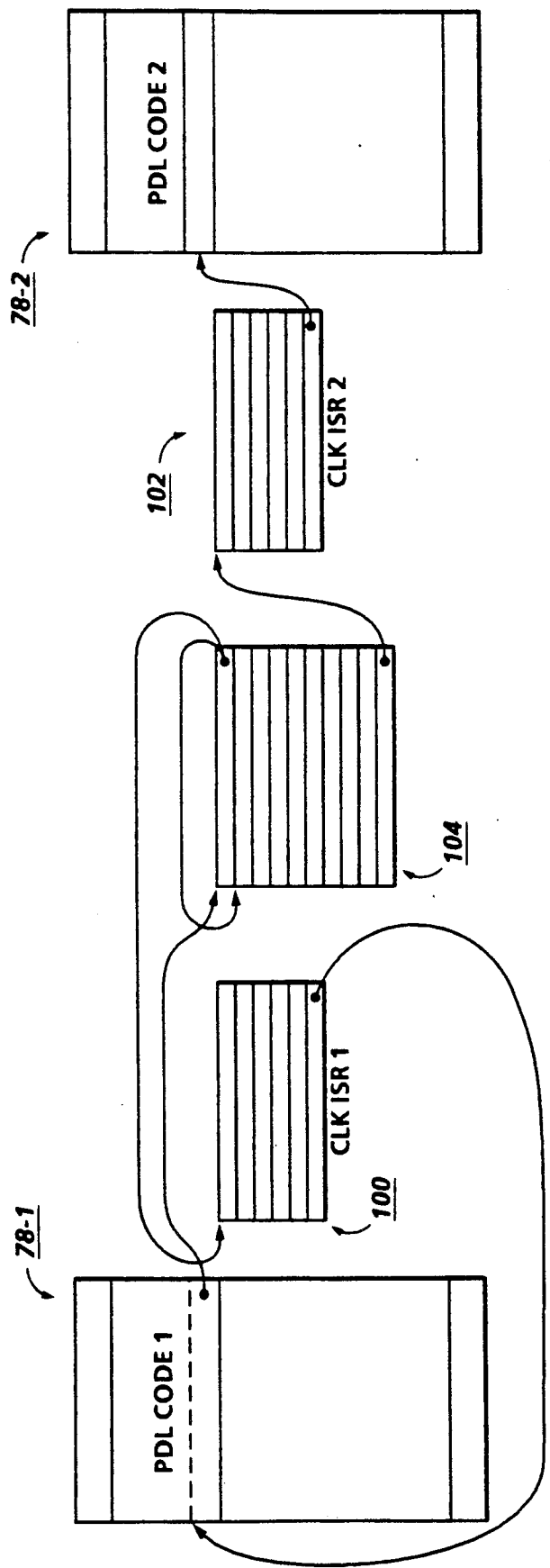
FIG. 6 is a schematic view of an interrupt routine used to achieve a preferred swapping routine of the present invention.

Referring to FIG. 6, the preferred swapping technique of the present invention is discussed in further detail. In the typical operation of a task-solving program, such as the PDL interpreting software selectively stored in the memory 78-1, the processor upon receiving an external signal branches to an interrupt service routine (ISR), from the system clock of the ACP, to perform predesignated interrupt functions. In the illustrated embodiment of FIG. 6, two interpretation files, namely memory map 78-1 and memory map 78-2, are shown. It should be recognized that while the maps 78-1 and 78-2 are shown in close proximity, only one of the maps 78-1 or 78-2 actually resides in the ACP 74 at any one time.

Additionally, the maps 78-1 and 78-2 operatively are associated with ISRs 100 and 102, respectively. For ease of discussion, only one of each ISRs 100, 102 is shown in FIG. 6; however, in practice, each memory map would be associated with a plurality of interrupt routines, the locations of which routines could be stored as vectors in an interrupt table. Referring to FIG. 5, the interrupt vectors for memory map 78-1 reside in an interrupt table 103. The ISRs 100, 102 (FIG. 6) communicate with a swapping routine 104 in a manner which will be discussed in further detail below. While the present arrangement only illustrates the use of two memory maps, the swapping technique could employ many memory maps, one of which would be disposed in the ACP 74 and the others of which would be stored in the disk storage device 76. That is, the server 25 is capable of storing more than two PDL interpreter files and more than one context for a given PDL interpreter and, accordingly, interpreting more than two types of PDLs or multiple configurations of the same PDL.

Referring to FIGS. 4-6, in one example of operation a first input PDL file is transmitted from one of the clients 15 to the host processor 72 and, software in the host processor determines that the PDL interpreter file 78-1, currently loaded in ACP processor 74 memory, can be used to interpret the job. A flag is set in the memory section 86, and the first input PDL file is transmitted to the ACP 74 for processing. As the memory map 78-1 is used to perform the interpretation, the process is interrupted periodically to perform one of the ISRs 100. In the preferred embodiment of the present invention, each tick of the ACP clock interrupts the execution of the program of the memory map 78-1 and, the program branches to a selected address in the swapping routine 104. If PDL interpretation of the job has not been completed, the process branches to the normal clock ISR 100, and eventually back to the program of memory map 78-1.

After the first input PDL file has been interpreted, a second input job file is transmitted to the host processor 72. In the immediate example, the second input PDL file is written in a different PDL than the first input PDL file. Before communicating the second input PDL file to the ACP 74, the host processor 72 sets the flag in the memory section 86 to indicate that the second memory map 78-2 is required for interpretation. After the status of the flag changes, the ISR (when invoked) branches to the swapping routine 104 for implementing the instructions thereof. The first mamory map 78-1 is swapped out of ACP 74 memory and written to disk section 94 and the second memory map 78-2 is read from disk 94, swapped to ACP 74 memory and execution of memory map 78-2 is resumed.

Figure 7A:
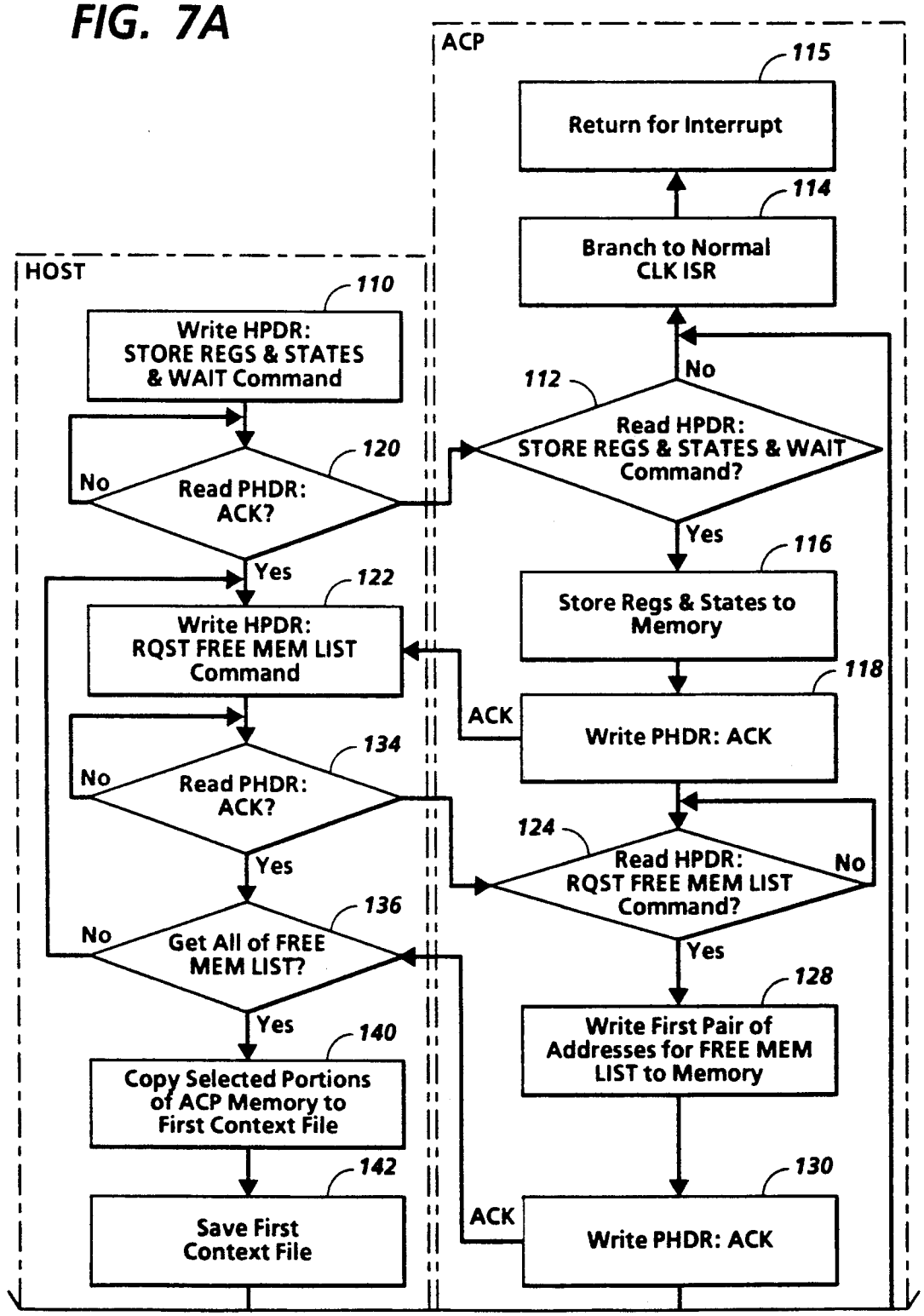
FIGS. 7A and 7B represent a flow diagram illustrating the preferred swapping routine.
Figure 7B:
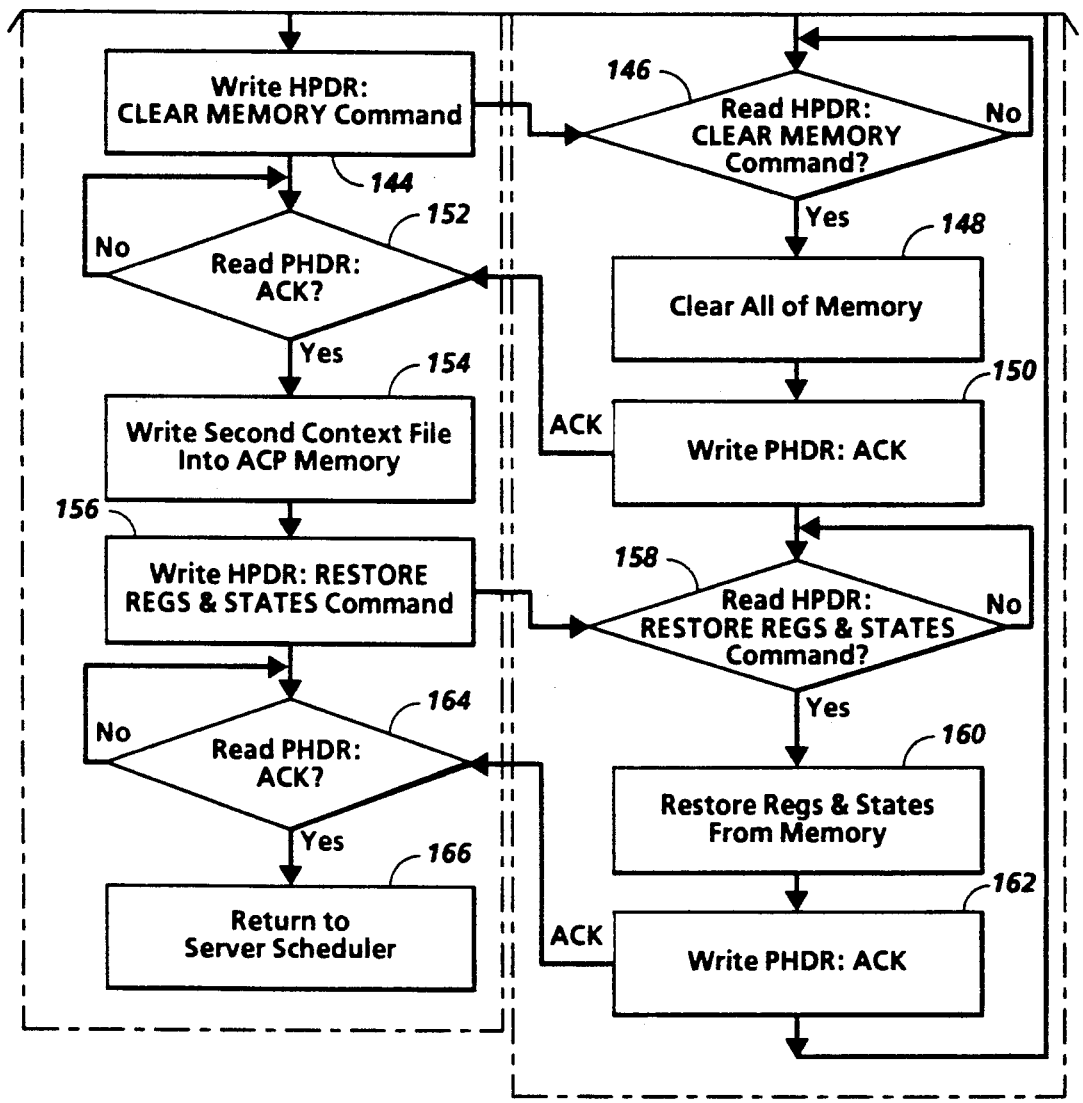

Referring to FIGS. 7A and 7B, the swapping routine 104 is discussed in further detail. It should be recognized that the swapping process is performed conjunctively between the host processor 72 and the ACP 74. Accordingly, two columns are shown to reflect the steps taken respectively by each processing arrangement. Moreover, in the swapping example of FIGS. 7A and 7B, a first context file representing significant portions of a first interpreting arrangement is swapped out to a host processor disk file and a second context file representing significant portions of a second interpreting arrangement are swapped from host disk file back into ACP memory.

When the host processor 72 determines than an incoming job file requires the use of an interpreting arrangement other than the one in the ACP 74, the host processor, at step 110, transmits a command, via the HPDR, to "STORE REGS (Registers) AND STATES AND WAIT", and the ACP 74 reads the command step 112. Until the ACP 74 receives the command, it continues to branch to one of ISRs 100 (step 114) and return to the main program (step 115). As soon as the command is received, the microprocessor 80 moves a first set of registers and states from microprocessor section 90 to memory section 92 (step 116) and, per step 118, sends an acknowledge signal to the host processor via the PHDR. It will be appreciated by those skilled in the art, and from the discussion below, that by saving the first set of registers and states of the microprocessor 80, i.e., the first internal state of the microprocessor 80, in the memory 78-1, the context of the first interpreting arrangement is maintained. Accordingly, when the first interpreting arrangement is used subsequently, and the first set of registers and states is replaced in microprocessor section 90, the microprocessor 80 need not be reinitialized for use with the first interpreting arrangement.

At step 120, the host processor 72 reads an acknowledge signal sent by the ACP 74, and, at step 122, the host processor 74 writes a "RQST (Request) FREE MEM (Memory) LIST" command to the HPDR. Each of the context files include a list of buffers or memory locations which need not be swapped, at least portions of the list being provided by the developers of the PDL interpretation codes. Upon reading this command at the HPDR (step 124), the ACP 74, per steps 128 and 130, indicates to the host processor 74 the start and end addresses of a first buffer in a free memory list 132 (FIG. 5). After receiving an acknowledge from the ACP 74 at step 134, the host processor 72 checks, at step 136, to determine if it has received the entire memory list. Typically, the free memory list includes start and end addresses for a plurality of buffers, or other memory locations, and it knows that the entire list has been read when it receives a suitable end signal from the ACP 74.

Following receipt of the last free memory buffer from the ACP 74, the host processor 72 copies selected portions of the memory 78-1 into the first context file (step 140), specifically ignoring those sections listed in the Free Memory List, and, via step 142, saves the first context file in disk section 94. Next the host processor 72, via step 144, sends a command to the ACP 74 directing it to clear memory map 78-1 so that all buffer areas are initialized properly. Upon receiving the clear command (step 146), the ACP 74 clears memory 78-1 (step 148) and sends an acknowledge signal to the host processor 72 at step 150. After memory 78-1 is cleared (step 152), the second context file is read from host processor disk 94 and written into the ACP 74 to form memory 78-2 (step 154), and the host processor 72, at step 156, sends a command to the ACP 74 to "RESTORE REGS & STATES," i.e., to write a second internal state from the memory map 78-2 to the microprocessor 80. Upon reading this command at step 158, the ACP 74 transfers the second internal state of the second interpreting arrangement from a memory section in the memory map 78-2 to the microprocessor section 90 (step 160) and, at step 162, sends an acknowledge signal to the host processor 72.

By providing the microprocessor 80 with the second internal state, it is able to begin processing of the second input PDL file without initialization. Essentially, once the microprocessor 80 is provided with the second internal state, the microprocessor 80 can proceed to execute the PDL interpretation code of memory 78-2 as if the microprocessor 80 always had been functioning in the second interpreting arrangement.

Referring to FIGS. 6 and 7B, after sending an acknowledge signal to the host processor 72, the ACP 74 branches to the ISR 102 (step 114) to restart the PDL interpretation process. In the meantime, upon receiving the acknowledge signal from the ACP 74 (step 164), the process, on the host processor side returns to a scheduler of the host processor 72 (step 166).

Numerous features of the present invention will be apparent to those skilled in the art. One feature of the present invention is that it provides a simple, yet effective swapping technique that allows for multiple PDL interpreter capability in an imaging system server. In particular, many context files can be stored in and used by the server without increasing its complexity significantly. Another feature of the present invention is that it is exceedingly economic. That is since a host processor controls a coprocessor in which interpretation operations are performed, only one host processor and operating system are required to service a plurality of clients and interpret a variety of PDLs presented by those clients. Yet another feature of the present invention is that it provides relatively fast service to the clients. More particularly, time savings are achieved by swapping only portions of memory maps between the coprocessor and a disk storage device as well as by changing the internal state of the coprocessor pursuant to each swap. Due to the efficiency of the swapping technique, the multiple interpreter capability of the server 25 is transparent to each interpreter and each client.

When the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A method for use with an imaging system server of the type having first processing means coupled with second processing means, the imaging system server being adapted to use a first memory map having a sequence of instructions to translate a first job written in a first printer page description language and to use a second memory map having a sequence of instructions to translate a second job written in a second printer page description language, one of the memory maps being disposed in the second processing means and portions of the other memory map being disposed in a storage section, comprising the steps of:

transmitting the first job to the second processing means;

setting a flag in the second processing means to a first status in response to transmitting the first job thereto;

translating the first printer page description language into a first interpreted output with the first memory map;

transmitting the second job to the first processing means;

setting the flag in the second processing means to a second status in response to transmitting the second job to the first processing means;

checking the status of the flag in the second processing means; and swapping portions of the first memory map and portions of the second memory map with the first processing means in response to a change in the status of the flag, so that the portions of the first memory are disposed in the storage section and portions of the second memory map are disposed in the second processing means to translate the second printer page description language into a second interpreted output.

2. The method of claim 1, wherein the step of transmitting comprises transmitting the first and second jobs with the first processing means, and wherein the step of checking comprises checking the status of the flag with the first processing means.

3. The method of claim 1, wherein the step of swapping comprises transferring, with the first processing means, the portions of the first memory map to a disk storage device.

4. The method of claim 1 in which the second processing means includes a processor and, during the step of using the first memory map to translate, the processor contains a set of information regarding a first internal state of the processor, wherein the step of swapping includes transferring the set of information to the first memory map in response to detecting the change in the status of the flag, so that the first internal state of the processor is transmitted to the storage section in response to the step of swapping.

5. The method of claim 4 in which a portion within the portions of the second memory map contains a set of information regarding a second internal state of the processor, wherein the step of swapping includes transferring the set of information regarding the second internal state of the processor from the storage section to the processor.

6. The method of claim 1, further comprising the steps of:

providing a list of locations in the first memory map to indicate those portions of the first memory map which need not be transferred to the storage section;

reading the list with the first processing means prior to performing the swapping step; and using the list to permit only first memory map portions other than those on the list to be transferred to the storage section.

7. The method of claim 1, further comprising the steps of:

transmitting the first interpreted output to a printing device;

decomposing the first interpreted output; and printing the decomposed, first interpreted output.

8. A method for swapping portions of a first memory map having a sequence of instructions and corresponding addresses with portions of a second memory map having a sequence of instructions and corresponding addresses, the first memory map being disposed in the processing means and portions of the second memory map being stored in a storage section, the first and second memory maps being operatively associated with first and second interrupt routines, respectively, each of the interrupt routines having a sequence of instructions with corresponding addresses, comprising the steps of:

swapping portions of the first memory map with the portions of the second memory map in accordance with a swapping routine having a sequence of instructions with corresponding addresses, one of the addresses in the sequence of instructions for the swapping routine representing a flag, the flag being set at a selected one of a first status and a second status;

processing the sequence of instructions for the first memory map;

interrupting, at selected intervals, the processing step to check the status of the flag in the sequence of instructions for the swapping routine;

processing the sequence of instructions in the first interrupt routine when the flag is set at the first status and, when the flag is set at the second status, processing the sequence of instructions in the swapping routine so that the portions of the first memory map are stored in the storage section and portions of the second memory map are disposed in the processing means.

9. The method of claim 8, further comprising the step of processing the sequence of instructions for the second memory map.

10. The method of claim 9, further comprising the step of branching from the swapping routine to a selected address of the second interrupt routine before executing the sequence of instructions of the second memory map.

11. The method of claim 8 in which the processing means includes a processor capable of executing either the sequence of instructions for the first memory map or the sequence of instructions for the second memory map, wherein, during the processing step, the processor contains a set of information regarding a first internal state of the processor, wherein, during the step of processing the sequence of instructions in the swapping routine, transferring the set of information regarding the first internal state of the processor to the first memory map.

12. The method of claim 11 in which a selected one of the portions of the second memory map contains a set of information regarding a second internal state for the processor, wherein the method further comprises the step of transferring the selected one of the portions of the second memory map to the processor after the portions of the second memory map have been disposed in the second processing means.

13. The method of claim 9 in which second processing means is provided, wherein the swapping step comprises swapping the portions of the first memory map and the portions of the second memory map with the second processing means.

14. The method of claim 8, wherein the step of processing the sequence of instructions for the first memory map comprises translating a first printer page description language into a translated output by executing the sequence of instructions in the first memory map.

* * * * *